United States Patent
Bakir et al.

(10) Patent No.: US 12,026,194 B1
(45) Date of Patent: *Jul. 2, 2024

(54) QUERY MODIFICATION BASED ON NON-TEXTUAL RESOURCE CONTEXT

(71) Applicant: GOOGLE LLC, Mountain View, CA (US)

(72) Inventors: Gokhan H. Bakir, Zurich (CH); Behshad Behzadi, Freienbach (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,226

(22) Filed: Feb. 13, 2023

Related U.S. Application Data

(63) Continuation of application No. 16/785,241, filed on Feb. 7, 2020, now Pat. No. 11,580,181, which is a continuation of application No. 15/791,079, filed on Oct. 23, 2017, now Pat. No. 10,592,571, which is a (Continued)

(51) Int. Cl.
| | | |
|---|---|---|
| *G06F 16/00* | (2019.01) | |
| *G06F 16/248* | (2019.01) | |
| *G06F 16/332* | (2019.01) | |
| *G06F 16/583* | (2019.01) | |
| *G06F 16/951* | (2019.01) | |
| *G06F 16/9535* | (2019.01) | |

(52) U.S. Cl.
CPC ........ *G06F 16/5846* (2019.01); *G06F 16/248* (2019.01); *G06F 16/3322* (2019.01); *G06F 16/3325* (2019.01); *G06F 16/951* (2019.01); *G06F 16/9535* (2019.01)

(58) Field of Classification Search
CPC .............. G06F 16/5846; G06F 16/248; G06F 16/3322; G06F 16/3325; G06F 16/951; G06F 16/9535
USPC ........................................................ 707/723
See application file for complete search history.

(56) References Cited

U.S. PATENT DOCUMENTS

| | | |
|---|---|---|
| 7,389,181 B2 | 6/2008 | Meadow et al. |
| 7,689,613 B2 | 3/2010 | Candelore |
| 7,788,266 B2 | 8/2010 | Venkataraman et al. |

(Continued)

OTHER PUBLICATIONS

10 Mobile Astronomy Apps for Stargazers, [online] [Retrieved on Apr. 29, 2014]; Retrieved from the Internet URL: http://mashable.com/2011/06/21/astronomy-mobile-apps/; 13 pages; dated 2013.

(Continued)

*Primary Examiner* — Vincent F Boccio
(74) *Attorney, Agent, or Firm* — Gray Ice Higdon

(57) ABSTRACT

Methods, systems, and apparatus, including computer programs encoded on a computer storage medium, modifying queries based on non-textual content. In one aspect, a method includes receiving, from a user device, a query including a plurality of terms; determining active non-textual data displayed in an application environment on the user device; determining, from the non-textual textual data, modification data for the query; generating a set of modified queries based on the query and the modification parameters; scoring the modified queries according to one or more scoring criteria; selecting one of the modified queries based on the scoring; and providing, to the user device, search results responsive to the selected modified query.

20 Claims, 5 Drawing Sheets

Related U.S. Application Data continuation of application No. 14/313,559, filed on Jun. 24, 2014, now Pat. No. 9,830,391.

(56) References Cited

U.S. PATENT DOCUMENTS

| | | | |
|---|---|---|---|
| 8,126,897 B2* | 2/2012 | Sznajder | G06F 16/7844 706/14 |
| 8,316,019 B1 | 11/2012 | Ainslie et al. | |
| 8,321,406 B2 | 11/2012 | Garg et al. | |
| 8,391,618 B1 | 3/2013 | Chuang et al. | |
| 8,392,435 B1 | 3/2013 | Yamauchi | |
| 8,452,794 B2 | 5/2013 | Yang | |
| 8,515,185 B2 | 8/2013 | Lee et al. | |
| 8,521,764 B2 | 8/2013 | Pfleger | |
| 8,606,781 B2 | 12/2013 | Chi et al. | |
| 8,898,095 B2 | 11/2014 | Agrawal et al. | |
| 8,977,639 B2 | 3/2015 | Petrou et al. | |
| 9,116,952 B1 | 8/2015 | Heiler et al. | |
| 9,135,305 B2 | 9/2015 | Taubman et al. | |
| 9,830,391 B1 | 11/2017 | Bakir et al. | |
| 10,592,571 B1 | 3/2020 | Bakir et al. | |
| 2001/0053968 A1 | 12/2001 | Galitsky et al. | |
| 2004/0267730 A1 | 12/2004 | Dumais et al. | |
| 2007/0060114 A1 | 3/2007 | Ramer et al. | |
| 2007/0071320 A1 | 3/2007 | Yada | |
| 2007/0118357 A1* | 5/2007 | Kasravi | G06F 40/30 704/10 |
| 2007/0140595 A1 | 6/2007 | Taylor et al. | |
| 2007/0214131 A1 | 9/2007 | Cucerzan et al. | |
| 2008/0046405 A1 | 2/2008 | Olds et al. | |
| 2008/0270110 A1 | 10/2008 | Yurick et al. | |
| 2010/0205202 A1 | 8/2010 | Yang | |
| 2010/0306249 A1 | 12/2010 | Hill et al. | |
| 2010/0318532 A1* | 12/2010 | Sznajder | G06F 16/71 707/769 |
| 2011/0035406 A1 | 2/2011 | Petrou et al. | |
| 2011/0038512 A1 | 2/2011 | Petrou et al. | |
| 2011/0125735 A1 | 5/2011 | Petrou | |
| 2011/0128288 A1 | 6/2011 | Petrou et al. | |
| 2011/0137895 A1 | 6/2011 | Petrou et al. | |
| 2012/0109858 A1 | 5/2012 | Makadia et al. | |
| 2012/0191745 A1 | 7/2012 | Velipasaoglu et al. | |
| 2012/0215533 A1 | 8/2012 | Aravamudan et al. | |
| 2013/0132361 A1 | 5/2013 | Chen et al. | |
| 2013/0346400 A1 | 12/2013 | Ramsey et al. | |
| 2014/0046935 A1 | 2/2014 | Bengio et al. | |
| 2014/0172881 A1 | 6/2014 | Petrou et al. | |
| 2015/0058318 A1 | 2/2015 | Blackwell et al. | |

OTHER PUBLICATIONS

Google announces Search by Image and Voice Search for desktop, revamped mobile search, [online] Retrieved on Apr. 29, 2014]; Retrieved from the Internet URL: http://www.engadget.com/2011/06/14/google-announces-search-by-imag . . . ,; 6 pages; dated 2014.

Google's Impressive "Conversational Search" Goes Live On Chrome, [online] [Retrieved on May 5, 2014]; Retrieved from the Internet URL: http://searchengineland.com/googles-impressive-conversational-search-goes-line-on-chrome-160445, 12 pages; dated 2012.

Zhang et al., "Probabilistic Query Rewriting for Efficient and Effective Keyword Search on Graph Data," Proceedings of the VLDB Endowment 6(14):1642-1653; 12 pages; dated 2013.

* cited by examiner

QUERY MODIFICATION BASED ON NON-TEXTUAL RESOURCE CONTEXT

BACKGROUND

This specification relates to search query processing.

The Internet provides access to a wide variety of resources, for example, video files, image files, audio files, or Web pages, including content for particular subjects, book articles, or news articles. A search system can select one or more resources in response to receiving a search query. A search query is data that a user submits to a search system to satisfy the user's informational needs. The search queries are usually in the form of text, e.g., one or more query terms. The search system selects and scores resources based on their relevance to the search query and on their importance relative to other resources to provide search results. The search results are typically ordered according to the scores and presented according to this order.

SUMMARY

This specification describes technologies relating to modifying queries based on the context of a non-textual resource displayed on a user device from which the query is received.

In general, one innovative aspect of the subject matter described in this specification can be embodied in methods that include the actions of receiving, from a user device, a query including a plurality of terms; determining active non-textual data displayed in an application environment on the user device; determining, from the non-textual textual data, modification data for the query; generating a set of modified queries based on the query and the modification parameters; scoring the modified queries according to one or more scoring criteria; selecting one of the modified queries based on the scoring; and providing, to the user device, search results responsive to the selected modified query. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Search queries can be input in a "conversational" manner, which results in a more fluid and intuitive user experience. The modification of a query may optionally be subject to a conversational signal, which precludes the modification of queries that are well formed or that otherwise exhibit a signal that the query is complete and should not be modified. Limiting the modifications to the context of the non-textual resource reduces the likelihood of topic drift or extraneous search results that may not be of interest to the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Described below are systems and methods for modifying a query based on a context of a non-textual resource. A search system receives a query, and determines that active non-textual data is displayed in an application environment on the user device in which the query was input. Active non-textual data may be, for example, an image selected by a user, and image taken by the user device, or a video that is displayed on the user device, or other non-textual data that is either implicitly or explicitly specified for defining a context for the query.

In some implementations, the system determines whether to modify the query received from the user device. For example, the system may skip the context modification for queries that are not ambiguous with respect to a term. Conversely, when a query includes an ambiguous term, or otherwise evidences a signal that it should be modified based on the context of the textual resource, the system will perform a context modification.

When performing a context modification, the system determines, based on the non-textual resource, modification data for the query, and generates a set of modified queries based on the query and the modification data. A variety of modification data types and query modification algorithms can be used. The system then scores the modified queries according to one or more scoring criteria. The score for each query may be based on the results of a search operation performed for each query, the similarity of the query to other, previously received queries, and other criteria. A modified query with a highest score relative to the other modified queries is selected, and search results responsive to the selected modified query are provided to the user device from which the original query was received.

These features and additional features are described in more detail below.

Figure 1:
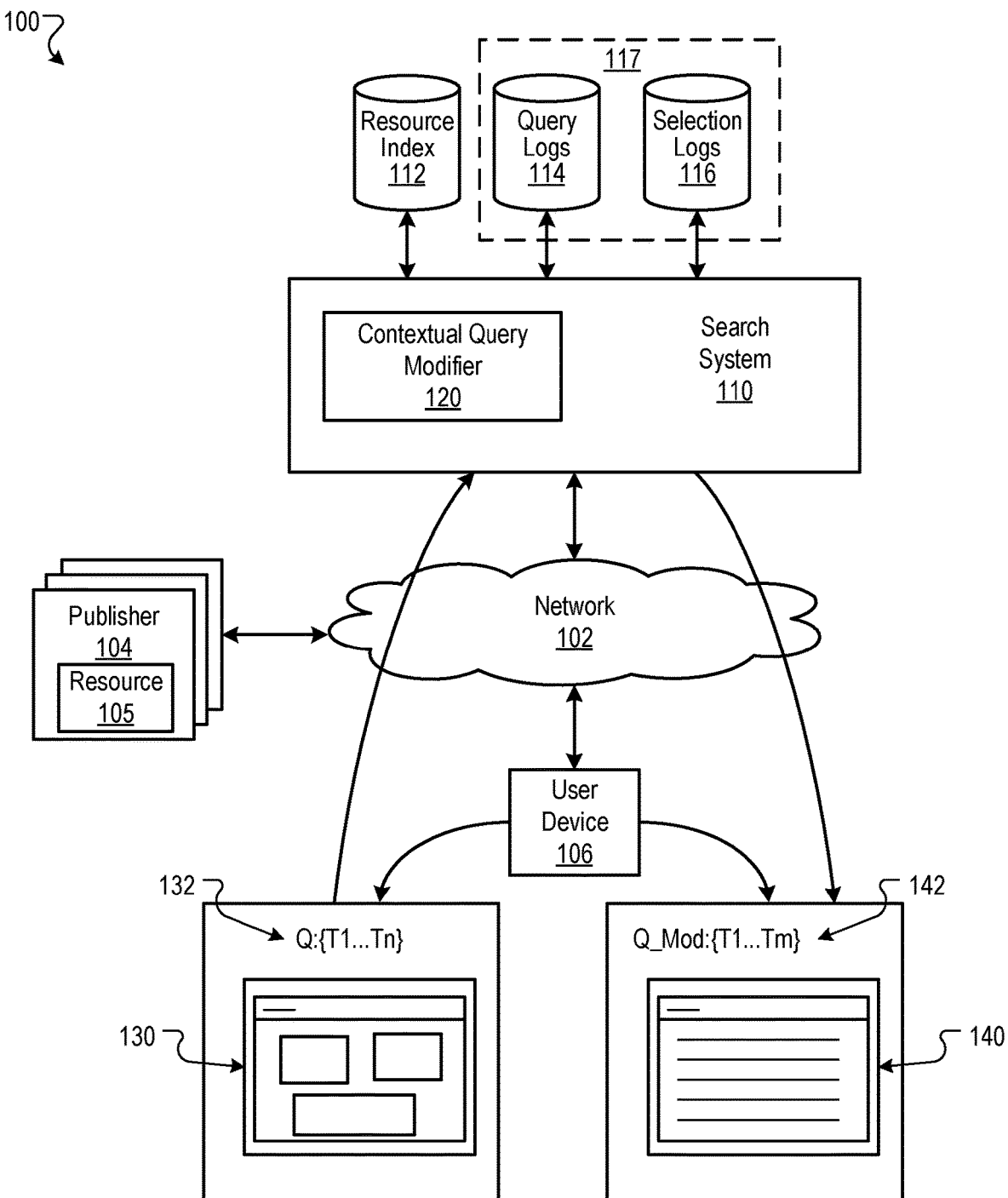
FIG. 1 is a block diagram of an example environment in which a search system 110 modifies queries based on a context defined by non-textual data.

FIG. 1 is a block diagram of an example environment in which a search system 110 modifies queries based on a context defined by non-textual data. A computer network 102, such as wide area network (WAN), the Internet, or a combination thereof, connects publisher web sites 104, user devices 106, and the search system 110. The online environment 100 may include many thousands of publisher web sites 104 and user devices 106.

A web site 104 is one or more web page resources 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site.

A resource is any data that can be provided by the publisher 104 over the network 102 and that is associated with a resource address. Resources include HTML pages, text documents, images, video, and feed sources, to name just a few. The resources can include content, such as words, phrases, pictures, and so on, and may include embedded information (such as meta information and hyperlinks) and/ or embedded instructions (such as scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser or some other application that can receive and display resources 105 over the network, to facilitate the sending and receiving of data over the network 102. The application can enable a user to display and interact with text, images, videos, music and other information typically located on a web page at a website on the network 102.

To facilitate searching of these resources 105, the search system 110 identifies the resources by crawling the publisher web sites 104 and indexing the resources provided by the publisher web sites 104. The indexed and, optionally, cached copies of the resources are stored in a resource index 112. Although one index 112 is shown, the index may include different corpora, such as a web page corpus, an image corpus, a video corpus, and the like.

The user devices submit search queries 109 to the search system 110. Search queries are submitted in the form of a search request for one or more resources responsive to the query. In response to the search request, the search system 110 uses the indexed cache 112 to identify resources that are relevant to the queries. The search system 110 identifies the resources in the form of search results and returns the search results to the user devices 106 in search results pages. A search result is data generated by the search system 110 that identifies a resource that satisfies a particular search query, and includes a resource locator for the resource. An example search result can include a web page title, a snippet of text extracted from the web page, and the URL of the web page. In the case of non-textual data such as images and videos, corresponding search results can include a thumbnail of the image, or a thumbnail of a frame of the video.

The resources referenced by the search results are ranked based on scores related to the resources identified by the search results, such as information retrieval ("IR") scores, and optionally a separate ranking of each resource relative to other resources (e.g., an authority score). In some implementations, the IR scores are computed from dot products of feature vectors corresponding to a query and a resource, and the ranking of the search results is based on relevance scores that are a combination of the IR scores and authority scores. The search results are ordered according to these scores and provided to the user device according to the order. In the case of images and videos, data describing the images and videos, such as text labels, captions, and metadata, can be used for determining IR scores. Selection rates, play rates, and other data for the images and videos can also be used.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In some implementations, the queries 109 submitted from user devices 106 are stored in query logs 114. Click data for the queries and the web pages referenced by the search results are stored in click logs 116. The query logs 114 and the click data 116 define search history data 117 that include data from and related to previous search requests associated with unique identifiers. The click data define actions taken responsive to search results provided by the search system 110. The query logs 114 and click logs 116 can be used to map queries submitted by the user devices to web pages that were identified in search results and the actions taken by users (i.e., that data are associated with the identifiers from the search requests so that a search history for each identifier can be accessed). The click logs 116 and query logs 114 can thus be used by the search system to the sequence of queries submitted by the user devices, the actions taken in response to the queries, and how often the queries are submitted.

In addition to requesting general search results, users often use the search system to seek "answers" rather than a breadth of information. An answer is a fact or relation that is responsive to a question. A "question query" differs from an informational query in that the question query seeks the answer, while the informational query is a request for a variety of different types of information for a subject. For example, the question query "How high is Pikes Peak" is a structured query that clearly requests a fact—the height of Pikes Peak. A search system can detect the structured nature of the query and interpret the query as a question query, and provide, in response to the query, a particular result that provides an answer to the question, and optionally other results.

In some implementations, the search system 110 includes a contextual query modifier 120 that modifies a received query based on a context defined by the textual content of an active resource. For example, as shown in FIG. 1, a resource 130 may be rendered on a user device 106 when the user inputs a search query 132 for an active textual resource 130. The search query 132 is typically a set of terms, e.g., Q:{T1 . . . Tn}. As will be described in more detail below, the contextual query modifier 120 determines active non-textual data for the query and generates a number of candidate modified queries, scores each candidate modified query, and selects the candidate modified query with the highest score as a modified query. The selected modified query is then processed as a search query and one or more results responsive to the query 142 are returned to the user device that submitted the query, e.g., in the form of a search results page 140. In some implementations, the contextual query modifier 120 may first determine whether there is a signal that indicates a contextual modification of the query is required before generating and scoring the candidate modified queries.

Figure 2:
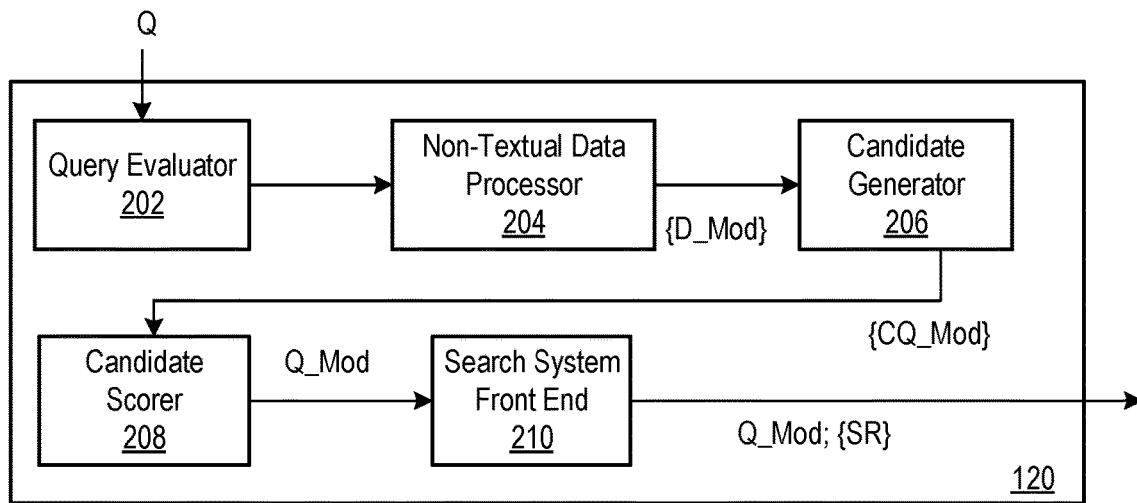
FIG. 2 is a block diagram of an example contextual query modifier.
Figure 4A:
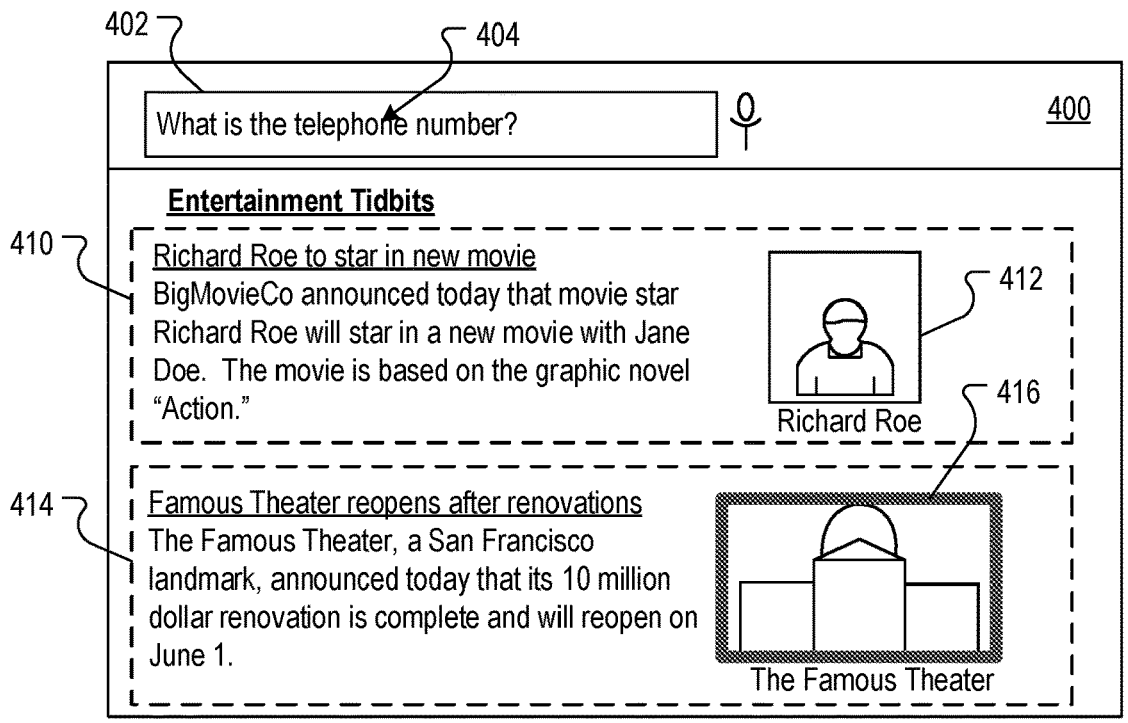
FIG. 4A is an illustration of a display environment in which a resource is displayed and a query is input.
Figure 4B:
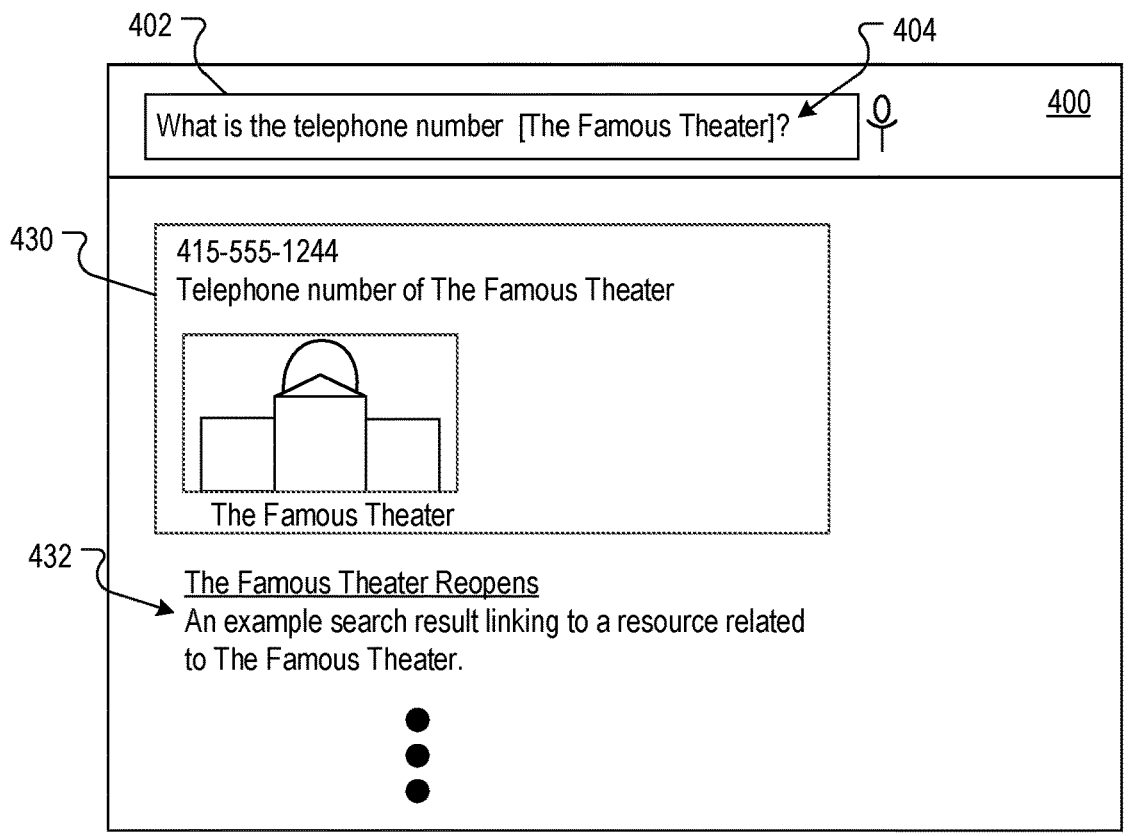
FIG. 4B is an illustration of a display environment in which a search result for a modified query is displayed.
Figure 5:
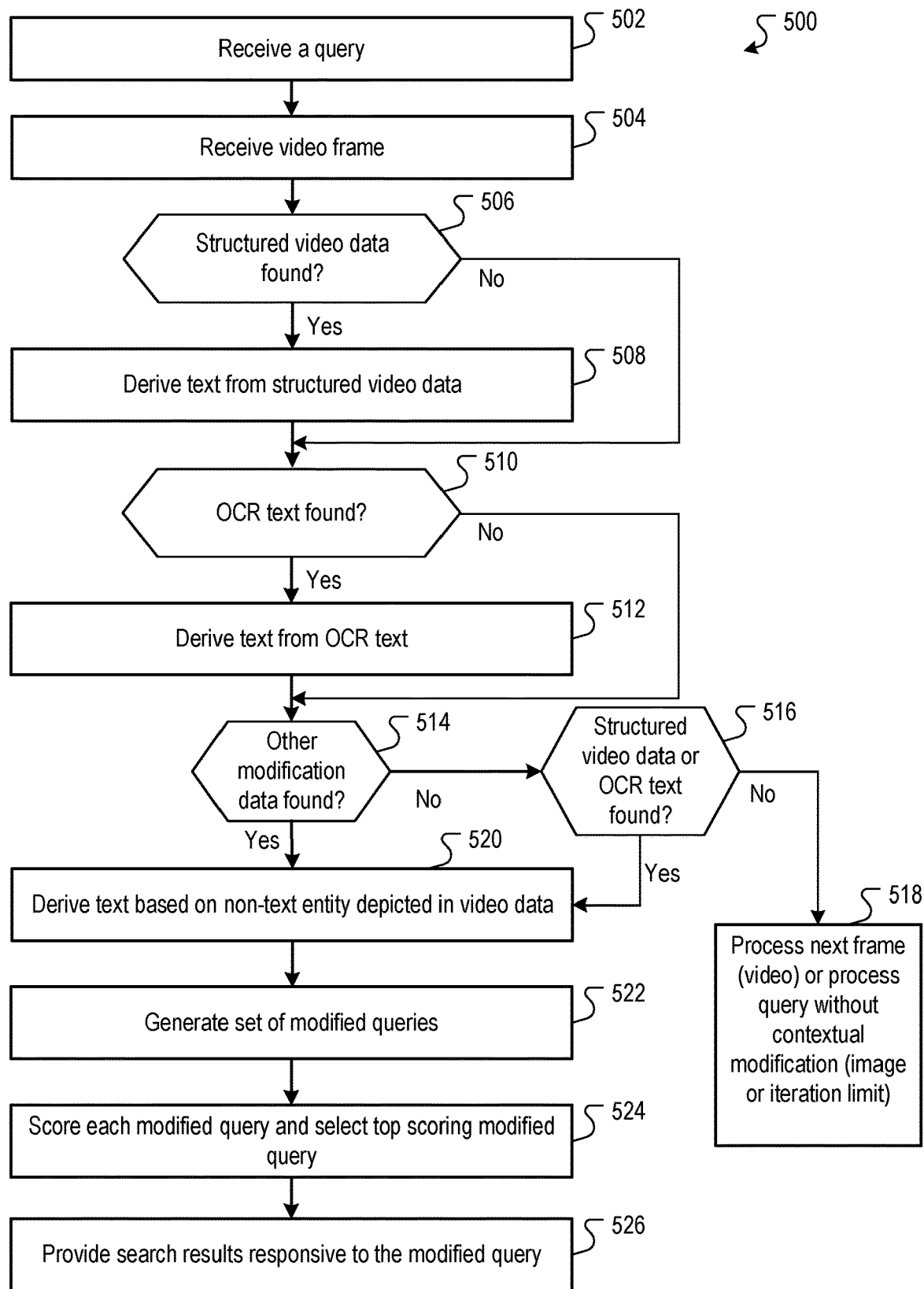
FIG. 5 is a flow diagram of an example process for modifying a query based on video frames.
Figure 6A:
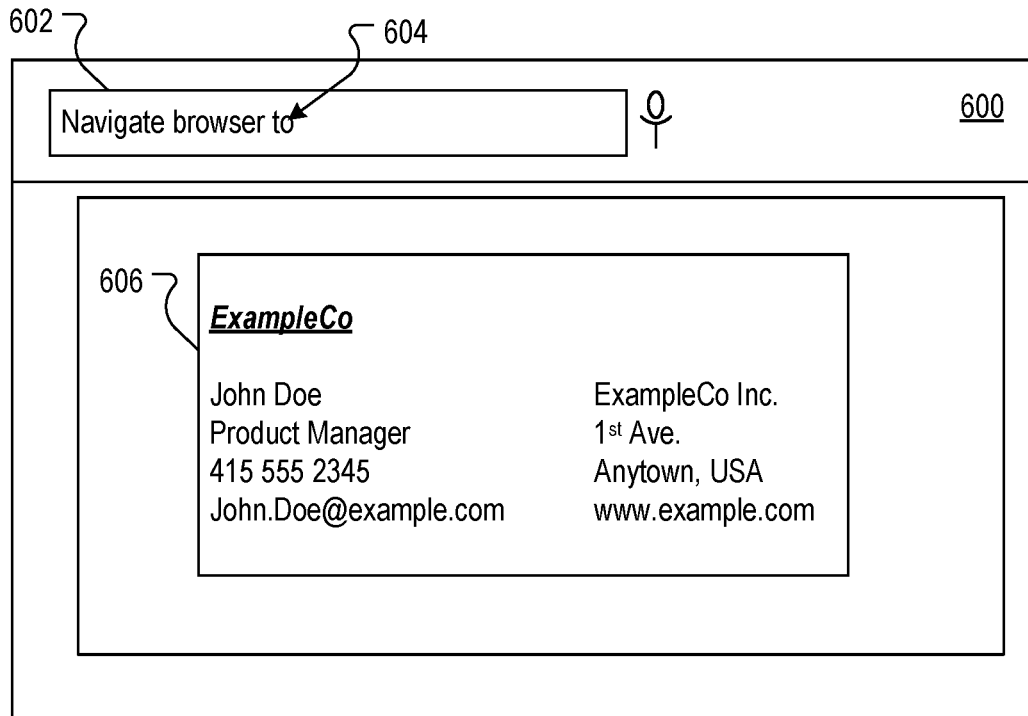
FIG. 6A is an illustration of a display environment in which a video frame is displayed and a query is input.
Figure 6B:
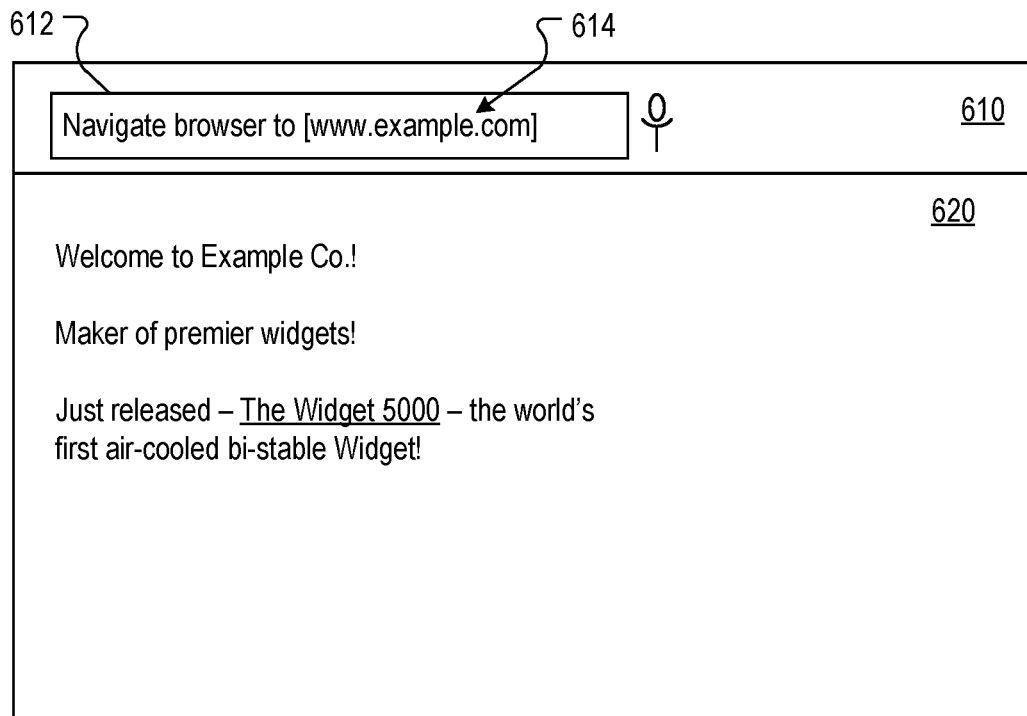
FIG. 6B is an illustration of a display environment in which is displayed a web page resource in response to an action taken for a modified query.

The operation of the contextual query modifier 120 is described in more detail with reference to FIGS. 2-6B below. In particular, FIG. 2 is a block diagram 200 of an example contextual query modifier 120. The contextual query modifier 120 can process images provided by publishers 104, images taken by the user of the user device, and even videos taken by a user. In the examples below, FIGS. 3, 4A and 4B are referenced to illustrate an example contextual modification based on an image, and FIGS. 5, 6A and 6B are referenced to illustrate an example contextual modification based on a video.

Figure 3:
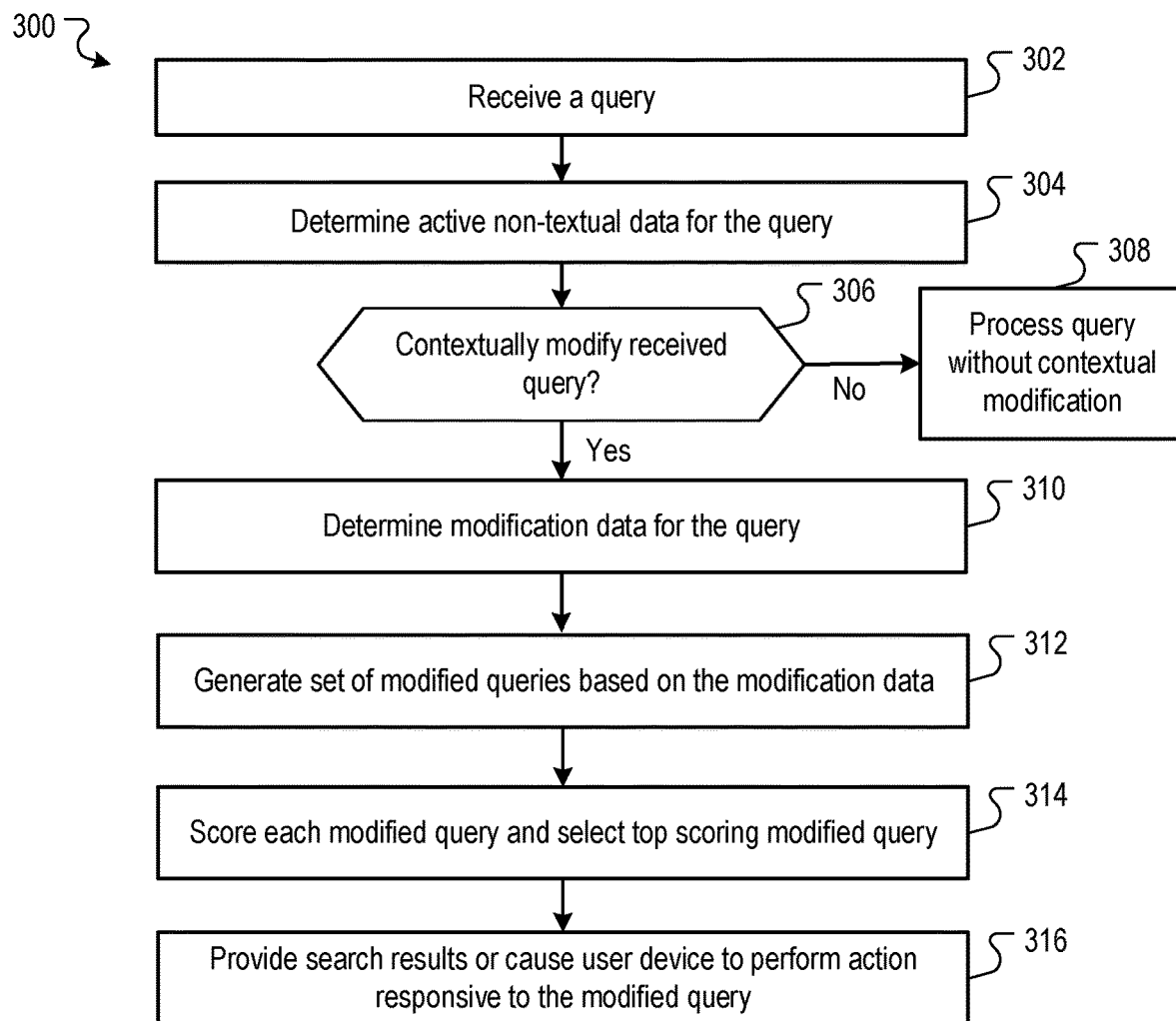
FIG. 3 is a flow diagram of an example process for modifying a query based on a non-textual context.

FIG. 3 is a flow diagram of an example process 300 for modifying a query based on a non-textual context. The process 300 is implemented in the example contextual query modifier 120 of FIG. 2. The functional architecture of FIG. 2 can be realized by programming a data processing apparatus to perform the functions described, and is but one example implementation of the contextual query modifier 120. Other functional distributions and subsystems can also be used.

In operation, the query evaluator 202 receives a query (302). For example, the search system 110 receives the query Q from the user device 106. With reference to FIG. 4A, the search system may receive the query 404 [What is the telephone number] entered into the input field 402.

The query evaluator 202 determines active non-textual data for the query (304). In some implementations, active non-textual data are data that are displayed in an active environment, such as an active window, or that is either implicitly or explicitly specified defining a context for the query. For example, the received query may include data identifying a URL of an image, such as the URL of a selected image displayed in a resource that, in turn, is displayed in a browser when the query is input. By way of another example, the query evaluator 202 may determine an application context to which the query belongs. The application context corresponds to an application instantiated on the user device, such as a browser, a camera application, a video player, etc. The query evaluator 202 then determines the non-textual data displayed in an application environment of the application. The application environment, for example, may be a window or other environment under control of an application and in which an application presents data. This can be done by, for example, issuing a request to the application for the address of the resource, or by receiving a copy of the non-textual data, or by some other appropriate process.

Again with reference to FIG. 4A, the active non-textual data is the image 416 displayed in the resource 406 shown in the display environment 400. The display environment 400 includes content elements 410 and 414 in which images 412 and 416 are displayed. The content elements 410 and 414 may be defined by the document object model, or some other formatting/markup convention. The image 416 has, for example, been selected by the user, which is a signal that the image is the active non-textual data. Conversely, the image 412 has not been selected, and thus is not determined to be active non-textual data.

If there is no active non-textual data, then in some implementations the query evaluator may determine to not modify a query. For example, suppose a user speaks into a smart phone [What is the telephone number], but no non-textual data are displayed. The query evaluator 202 will determine that no non-textual data is associated with the query, and thus no contextual modifications based on non-textual data can be made.

The query evaluator 202 then determines whether to contextually modify the received query (306). Even if there is active non-textual data, the query may not need to be modified. For example, the query may be so well formed to provide a definite, unambiguous instruction, such as "What is the phone number of Joe's Bistro in San Francisco?" or "Search for newly released widgets." Conversely, should the query include an ambiguous referring term, such as "[When was he born], where the pronoun "he" is ambiguous as to identity, then the query evaluator 202 determines the query should be modified based on the context of the non-textual data. Likewise, should the query form an otherwise incomplete inquiry, such as "What is the telephone number," then the query evaluator 202 determines the query should be modified based on the context of the non-textual data.

A variety of appropriate algorithms can be used to determine whether a query is well formed to provide a definite, unambiguous instruction. For example, context free grammars, natural language processing, or even a list of queries can be used and applied to the received query.

Other appropriate ways of determining whether to modify a query can also be used. For example, in some implementations, the search system 110 will conduct a search based on the query, and the query evaluator 202 will evaluate the results. If the results do not meet one or more threshold, then the query may be modified. Example thresholds include a quality threshold that indicates a quality of the top-scoring resources identified as being responsive to the query; a topicality threshold that indicates that the top-scoring resources have a dominant intent of at least one topic, etc.

If the query evaluator 202 determines not to contextually modify the received query, then the query is processed without contextual modification (308). Conversely, if the query evaluator 202 does determine to contextually modify the received query, then the textural resource processor 204 determines modifications modification data for the query (310). Appropriate modification data are data that can be used to generate modified queries from the received query. For example, the non-textual data processor 204 may determine, from the non-textual data, entity text that describes entities. As used herein, entities are topics of discourse, concepts or things that can be referred to by a text fragment, e.g., a term or phrase, and are distinguishable from one another, e.g., based on context. Example entities include persons, places, locations, addresses, dates, and products. Entities may also be subjects of an entity relation graph, such as a knowledge graph. For example, the selected image may have corresponding entity relations and descriptions established in the index 112. The non-textual data processor 204 can access entity data that describes such entities identified in textual data describing the associated entities.

By way of another example, the image may have associated labels. The labels may be from web page captions in web pages on which the image is displayed, or assigned by users, or based on visual information retrieval. In the case of the latter, a model based on visual features such as color, texture and shapes, also referred to as "local descriptors," may be used to provide information that describe the subject matter of the image.

Additionally, the image or video itself may be processed for modification data. Such processing may be especially useful for when an image is taken by a user and the same image is not indexed in the index 112, or when there is otherwise little information in the index 112 for the image. For example, the image may be processed to determine visual features that match visual features of other images. Provided a similarity measure that measures the similarity of the visual features of the image to another image meets a threshold, then labels and entities associated with the other image may be used as modification data for the query. In additional implementations, the image may be processed for structured data, such as bar codes and QR codes, and also processed for OCR. The processing of an image or video for such non-textual data is described with reference to FIGS. 5, 6A and 6B below.

The modification data is not limited to entities and labels, however. For example, metadata of the image or video can be processed to determine other modification data, such as a domain name, which may correspond to a company name, product listing data that corresponds to a product listed in the resource; and so on. Topics can also be used as modification data. For example, an image or video may have been categorized as belonging to one or more topics, and each topic name can be used as modification data. Again, the non-textural data processor 204 can access such data for the video or image to identify the modification data for the resource.

The modification data that are produced may thus define a set of values and/or parameters that can be used to modify the received query. As shown in FIG. 2, the modification data are illustrated as the dataset {D_Mod}. For example, assume entity detection is used. From the resource 406, the following entities are detected from the selected image 416:

D_Mod={<The Famous Theater>,
<movie theater>,
<landmark>,
<San Francisco>,
<June 1>}.

The entities and labels listed may be detected from the caption "The Famous Theater Reopens June 1," from metadata of the image, from other data stored in the index 112 that describes the subject matter of the image, and from a visual analysis of the image features.

The candidate generator 206 generates a set of candidate modified queries based on the received query and the modification data (312). A variety of appropriate processes can be used to generate the candidate modified queries. In some implementations in which entity text are used for the modification data, entity text describing each entity is appended or prepended to the query. For example, for each entity described in the active textual resource, corresponding entity text can be concatenated with the query. Thus, for a set of entities E={e1, e2, . . . en} and a received query Q, the following set of candidate modified queries is generated:

CQ_Mod={Qe1, Qe2, . . . Qen}

For example, for the query Q [What is the telephone number], the following queries are generated:

CQ_Mod={[What is the telephone number the Famous Theater],
[What is the telephone number movie theater],
[What is the telephone number landmark],
[What is the telephone number San Francisco],
[What is the telephone number June 1]}.

In some implementations, all candidate queries are provided to the candidate scorer 208. In other implementations, the candidate generator 206 (or the candidate scorer 208) can implement a filtering process to filter out queries that include latent or patent type mismatches of terms. The mismatches can be detected using language models, attribute and entity maps, and the like. For example, the query [What is the telephone number June 1] has a patent mismatch between the attribute "telephone number" and the entity "June 1," and thus is removed from the scoring process.

In other implementations, a candidate query may be a query in which one or more terms are replaced based on the entity. For example, assume the query is [What is the phone number of that place], the candidate query may be [What is the phone number of the Famous Theater]. A variety of appropriate algorithms can be used to generate such query revisions. For example, context free grammars, natural language processing, or even a list of queries can be used and applied to the received query.

In still other implementations, query logs can be accessed to determine a similarity of a modified query (e.g., the text of the query and the entity text) to other prior queries stored in a query log. Prior queries for which the similarity measure meets a threshold similarity value may be selected as a candidate query. This type of candidate generation can optionally filter out "long tail" queries if the candidate query is a query that is rarely received, e.g., if the candidate query does not meet a minimum frequency threshold or instance count.

Other candidate query generation processes can also be used, and each of the candidate query generation processes described above can be used alone or in combination with each other.

The candidate modified queries are scored and a top scoring candidate modified query is selected (314). A variety of scoring processes can be used. In some implementations, each query is provided to the search system 110, which then scores resources for the query. For each query, the candidate scorer 208 receives search data describing relevance scores of the resources that are determined to be relevant to the modified query. Using this data, the candidate scorer generates a score for the modified query. Each score can be based on quality scores for the resources responsive to the query, where the quality score is an indicator of the quality of the resources relative to other resources. For example, a query for which a number of only low-quality resources are returned will be scored less than a query for which a number of high quality resources are returned.

Likewise, each score can be based on the number of resources that meet a relevance threshold. For example, when the relevance scores of resources are relatively low for a query, the query is likely a poorly formed query. Conversely, when the relevance scores of resources are relatively high for a query, the query is more likely to be a well formed query.

In some implementations, the candidate score 208 may take into account whether the query triggers a special search operation or action. The triggering of a special search operation by the candidate modified query can be interpreted as a signal that the candidate modified query is a well formed query for the special operation. For example, if a first candidate modified query is interpreted as a question query, and a second candidate modified query is not, then the score of the first candidate modified query may be boosted relative to the score of the second candidate modified query. Likewise, if a first candidate modified query is interpreted as an optional image search query, and a second candidate modified query is not, then the score of the first candidate modified query may be boosted relative to the score of the second candidate modified query. Similarly, if a first candidate modified query is interpreted as an action query that would invoke an action at the user device, and a second candidate modified query is not, then the score of the first candidate modified query may be boosted relative to the score of the second candidate modified query.

Other scoring processes can also be used, and each of the scoring processes described above can be used alone or in combination with each other.

The candidate modified query with the highest score relative to other candidate modification queries is selected by the candidate scorer 208, and is provided to the search system front end 210. The search system front end 210 then provides search results responsive to the modified query (316). Alternatively, if the modified query triggers an action, then data is sent to the user device that causes the user device to perform the action.

For example, as shown in FIG. 4B, the query [What is the telephone number The Famous Theater] is selected as the modified query 424. An answer box 430 is provided with the query, along with one or more search results 432.

The example of FIGS. 4A and 4B are described in the context of a question query. However, the same features apply equally to other queries and actions. For example, for an image of an author, a user may input the query [Show me a list of her books], and the search system 110 will process a modified query that causes a list of the author's books to be generated and displayed.

Likewise, and with reference to FIG. 4A, an action query, such as [Call that theater], may result in the user device taking an action that places a call to the "Famous Theater" theater. For example, metadata regarding the Famous Theater may include the phone number, and the modified query may be an action query that causes the user device to place a call to the phone number of the Famous Theater.

The example above is described in the context of image non-textual data for which information has been indexed in the index 112. Often, however, a user may take an image or be taking a video and want to know more about a subject depicted in the image or video. In such situations, the processing of structured video data and OCR text may be especially useful. Such processing is described with reference to FIGS. 5, 6A and 6B.

FIG. 5 is a flow diagram of an example process 500 for modifying a query based on video frames. The process 500 is implemented in the example contextual query modifier 120 of FIG. 2. Furthermore, FIG. 6A is an illustration of a display environment in which a video frame is displayed and a query is input, and FIG. 6B is an illustration of a display environment in which is displayed a web page resource in response to an action taken for a modified query. The process 500 is described with reference to FIGS. 6A and 6B.

The process 500 may be iterative or may be performed once, depending on the non-textual data received. For example, if a user is taking a video and issues a query, the process 500 may be performed for multiple frames until a candidate query is selected (or until an iteration limit is met, such as after N frames or M seconds). Alternatively, if the user has taken a picture, and the captured image is the non-textual data, then the process may be performed once for the captured image. For both situations—video and a single image—the non-textual data is referred to as a "video frame."

The query evaluator 202 receives a query (502). This step is similar to the step 302 of FIG. 3. For example, the user may issue the query 604 [Navigate browser to], as shown in the input field 602 of the display environment 600 of FIG. 6A. The user is also taking a video of a business card, for which a live video frame 606 is shown. Additional steps, such as steps similar to steps 304 and 306, can also be performed.

The non-textual data processor 204 receives a video frame (504). For example, the user may be taking a video of a subject, such as a video of a business card shown in FIG. 6A. Alternatively, the user may have taken a picture of the business card. In either case, the video frame 606 is received, having been transmitted by the user device 106 to the search system 110. For example, the non-textual data processor 204 may receive the video frame 606 shown in FIG. 6A.

The non-textual data processor 204 determines whether structured video data is found in the video frame (506). For example, the non-textual data processor 204 may process the video frame data for pre-defined structured codes, such as barcodes, QR codes, and other structured data. Any appropriate structured code processing techniques can be used.

If structured video data is found, then the non-textual data processor 204 derives text from the structured video data (508). For example, a barcode or QR code can be decoded to derive the encoded text using appropriate decoding algorithms. In FIG. 6A, the image of the business card does not included structured data, and thus no structured data is found.

After deriving the text from the structured video data, or if no structured video data is found, the non-textual data processor 204 determines whether OCR text is found in the video frame (510). A variety of OCR algorithms can be used.

If OCR text is found, then the non-textual data processor 204 derives text from the OCR text (512). In FIG. 6A, the text of the business card image will be recognized using an OCR algorithm.

After deriving OCR text, or if no OCR text is found, the non-textual data processor 204 determines whether other modification data associated with the video frame is found (512). This step can include some or all of the processing techniques described with reference to FIG. 3 above, provided the underlying associated data for each technique is available.

If other modification data is not found, then the non-textual data processor 204 determines whether any structured video data or OCR text was found (516). If neither structured video data nor OCR text was found, then one of several operations may occur (518). For example, another frame of video may be processed, or the query may be processed without contextual modification if the non-textual data is an image, or if an iteration limit for a video stream is met.

However, if any of structured video data, OCR text or other modification data is found, then a set of modified queries is generated (522), each modified query is scored and a top scoring modified query is selected (524), and search results are provided for the selected modified query or the user device is caused to perform an action triggered by the modified query (526). Steps 522, 524 and 526 are similar to steps 312, 314 and 316 of FIG. 3.

With respect the example of FIGS. 6A and 6B, the text of the business card can be processed to determine particular entities. Example entities could be:

D_Mod={<ExampleCo>,
<John Doe>,
<Product Manager>,
<415 555 2345>,
<John.Doe@example.com>,
<ExampleCo. Inc., 1st Ave., Anytown, USA>,
<www.example.com>}.

According, example candidate modified queries may include:

CQ_Mod={<Navigate browser to ExampleCo>,
<Navigate browser to John Doe>,
<Navigate browser to Product Manager>,
<Navigate browser to 415 555 2345>,
<Navigate browser to John.Doe@example.com>,
<Navigate browser to ExampleCo. Inc., $1^{st}$ Ave., Anytown, USA>,
<Navigate browser to www.example.com>}.

Each of the candidate modified queries can be scored as described above. Additionally, some of the candidate modified queries could be filtered; for example, using language models, such as grammars and parts of speech analyzers, erroneous or poorly formed queries such as [Navigate browser to Product Manager], [Navigate browser to John.Doe@example.com], etc. could be filtered and not scored.

In the example of FIG. 6B, the candidate modified query [Navigate browser to www.example.com] has the highest score, and also triggers an action at the user device that causes the user device to navigate to the web page 620 of www.example.com.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by one or more processors, the method comprising:
   receiving a plurality of terms;
   determining that the plurality of terms is an ambiguous instruction and that a user device is being used to capture image data when the plurality of terms is received, and in response:
   identifying the image data captured by the user device;
   automatically determining, based on the image data captured by the user device, modification data for the ambiguous instruction;
   automatically generating a set of modified instructions based on the ambiguous instruction and the modification data;
   automatically scoring each modified instruction in the set of modified instructions according to one or more scoring criteria;
   automatically selecting one of the modified instructions from the set of modified instructions, based on the one of the modified instructions having a highest score relative to other modified instructions in the set of modified instructions; and
   causing the user device to perform an action defined by the one of the modified instructions.

2. The method of claim 1, wherein automatically determining, based on the image data captured by the user device, the modification data for the ambiguous instruction comprises:
   determining, from one or more images included in the image data captured by the user device, labels that describe subject matter of the one or more images; and
   for each label, generating a modified instruction based on the ambiguous instruction and the label.

3. The method of claim 2, wherein generating the modified instruction based on the ambiguous instruction and the label comprises concatenating the ambiguous instruction with the label.

4. The method of claim 1, wherein automatically determining, based on the image data captured by the user device, the modification data for the ambiguous instruction comprises:
   determining, from one or more images included in the image data captured by the user device, entity text describing entities depicted in the one or more images; and
   for each entity, generating a modified instruction based on the ambiguous instruction and the entity.

5. The method of claim 4, wherein generating the modified instruction based on the ambiguous instruction and the entity text describing the entity comprises revising one or more terms of the ambiguous instruction based on the entity text describing the entity.

6. The method of claim 1, wherein automatically determining, based on the image data captured by the user device, the modification data for the ambiguous instruction comprises:
   processing a video frame, included in the image data captured by the user device, for structured video data;
   detecting structured video data;
   deriving text from the structured video data; and
   generating a modified instruction based on the ambiguous instruction and the text.

7. The method of claim 1, wherein automatically determining, based on the image data captured by the user device, the modification data for the ambiguous instruction comprises:
   performing optical character recognition on one or more video frames, included in the image data captured by the user device, to derive text from the one or more video frames; and
   generating one or more modified instructions based on the ambiguous instruction and the text.

8. The method of claim 7, wherein deriving text from the one or more video frames comprises detecting entity text from the text that describes an entity.

9. The method of claim 8, wherein generating the one or more modified instructions based on the ambiguous instruction and the text comprises revising one or more terms of the ambiguous instruction based on the entity text describing the entity.

10. The method of claim 1, wherein the plurality of terms are spoken by a user of the user device.

11. The method of claim 10, wherein receiving the plurality of terms that are spoken by the user of the user device comprises receiving text generated by a speech analyzer.

12. The method of claim 1, wherein the plurality of terms are input by a user of the user device.

13. The method of claim 1, wherein the image data comprises an image taken by a user of the user device.

14. The method of claim 1, wherein the image data comprises a video taken by a user of the user device.

15. A computer program product comprising one or more non-transitory computer-readable storage media having program instructions collectively stored on the one or more computer-readable storage media, the program instructions executable to:
  receive a plurality of terms;
  determine that the plurality of terms is an ambiguous instruction and that a user device is being used to capture image data when the plurality of terms is received, and in response:
    identify the image data captured by the user device;
    automatically determine, based on the image data captured by the user device, modification data for the ambiguous instruction;
    automatically generate a set of modified instructions based on the ambiguous instruction and the modification data;
    automatically score each modified instruction in the set of modified instructions according to one or more scoring criteria;
    automatically select one of the modified instructions from the set of modified instructions, based on the one of the modified instructions having a highest score relative to other modified instructions in the set of modified instructions; and
    cause the user device to perform an action defined by the one of the modified instructions.

16. The computer program product of claim 15, wherein automatically determining, based on the image data captured by the user device, the modification data for the ambiguous instruction comprises:
  determining, from one or more images included in the image data captured by the user device, labels that describe subject matter of the one or more images; and
  for each label, generating a modified instruction based on the ambiguous instruction and the label.

17. The computer program product of claim 16, wherein generating the modified instruction based on the ambiguous instruction and the label comprises concatenating the ambiguous instruction with the label.

18. The computer program product of claim 15, wherein automatically determining, based on the image data captured by the user device, the modification data for the ambiguous instruction comprises:
  determining, from one or more images included in the image data captured by the user device, entity text describing entities depicted in the one or more images; and
  for each entity, generating a modified instruction based on the ambiguous instruction and the entity.

19. The computer program product of claim 18, wherein generating the modified instruction based on the ambiguous instruction and the entity text describing the entity comprises revising one or more terms of the ambiguous instruction based on the entity text describing the entity.

20. A system comprising:
  a processor, a computer-readable memory, one or more computer-readable storage media, and program instructions collectively stored on the one or more computer-readable storage media, the program instructions executable to:
  receive a plurality of terms;
  determine that the plurality of terms is an ambiguous instruction and that a user device is being used to capture image data when the plurality of terms is received, and in response:
    identify the image data captured by the user device;
    automatically determine, based on the image data captured by the user device, modification data for the ambiguous instruction;
    automatically generate a set of modified instructions based on the ambiguous instruction and the modification data;
    automatically score each modified instruction in the set of modified instructions according to one or more scoring criteria;
    automatically select one of the modified instructions from the set of modified instructions, based on the one of the modified instructions having a highest score relative to other modified instructions in the set of modified instructions; and
    cause the user device to perform an action defined by the one of the modified instructions.

\* \* \* \* \*